United States Patent
Wu et al.

(10) Patent No.: US 9,551,569 B2
(45) Date of Patent: Jan. 24, 2017

(54) APPARATUS AND METHOD FOR CURVATURE AND THIN FILM STRESS MEASUREMENT

(71) Applicant: HERMES-EPITEK CORPORATION, Taipei (TW)

(72) Inventors: Chung-Yuan Wu, Hsinchu (TW); Robert Champetier, Hsinchu (TW); Chung-Hua Fu, Hsinchu (TW); Bu-Chin Chung, Hsinchu (TW)

(73) Assignee: Hermes-Epitek Corporation, Taipei (TW)

( * ) Notice: Subject to any disclaimer, the term of this patent is extended or adjusted under 35 U.S.C. 154(b) by 0 days.

(21) Appl. No.: 14/513,168

(22) Filed: Oct. 13, 2014

(65) Prior Publication Data

US 2016/0102968 A1   Apr. 14, 2016

(51) Int. Cl.
*G01B 11/16* (2006.01)
*G02B 27/30* (2006.01)
*G01B 11/24* (2006.01)

(52) U.S. Cl.
CPC ............... *G01B 11/16* (2013.01); *G01B 11/24* (2013.01); *G02B 27/30* (2013.01)

(58) Field of Classification Search
CPC ....... G01B 11/30; G01B 11/255; G01B 11/24; G01B 11/16
See application file for complete search history.

(56) References Cited

U.S. PATENT DOCUMENTS

| | | | | |
|---|---|---|---|---|
| 3,601,490 A | * | 8/1971 | Erickson | G01B 9/02018 356/493 |
| 4,119,380 A | * | 10/1978 | Raftopoulos | G01L 1/24 356/32 |
| 4,798,469 A | * | 1/1989 | Burke | G01B 11/24 356/609 |
| 5,072,104 A | * | 12/1991 | Tatian | G02B 27/0025 250/201.9 |
| 5,168,485 A | * | 12/1992 | Lehureau | G02B 5/1833 369/112.17 |
| 5,835,190 A | * | 11/1998 | Miyake | A61B 3/107 351/212 |
| 6,975,410 B1 | | 12/2005 | Sturgill | |
| 7,505,150 B2 | | 3/2009 | Zettler et al. | |

(Continued)

FOREIGN PATENT DOCUMENTS

WO    WO2007/015616 A1    2/2007

OTHER PUBLICATIONS

Office Action Dated Jul. 29, 2016 in corresponding Taiwan Patent Application No. 103139967.

*Primary Examiner* — Tarifur Chowdhury
*Assistant Examiner* — Maurice Smith
(74) *Attorney, Agent, or Firm* — Donald E. Stout; Stout, Uxa & Buyan, LLP

(57) ABSTRACT

Apparatus and method for curvature and thin film stress measurement are disclosed. The apparatus comprises two light sources and a detector. Two light beams from the two light sources with an angle are not parallel. The two light beams are collimated and projected onto a specimen with a pitch. The detector receives the light beams reflected from the specimen. The curvature of the specimen is calculated via a distance between spots of the light beams on the detector or a size variation of one of the spots.

15 Claims, 4 Drawing Sheets

(56) References Cited

U.S. PATENT DOCUMENTS

| | | | |
|---|---|---|---|
| 7,519,502 B1* | 4/2009 | Carneal | G01B 11/24 |
| | | | 33/503 |
| 7,570,368 B2 | 8/2009 | Belousov et al. | |
| 7,742,168 B2 | 6/2010 | Elton et al. | |
| 2002/0027664 A1* | 3/2002 | Hyers | G01B 11/24 |
| | | | 356/614 |
| 2002/0131036 A1* | 9/2002 | Takahashi | G01B 11/16 |
| | | | 356/32 |
| 2005/0007601 A1 | 1/2005 | Rosakis et al. | |
| 2007/0030493 A1 | 2/2007 | Zettler et al. | |
| 2007/0085904 A1* | 4/2007 | Heyworth | G01B 11/16 |
| | | | 348/82 |
| 2008/0186512 A1* | 8/2008 | Kee | G01B 11/25 |
| | | | 356/610 |
| 2011/0116520 A1* | 5/2011 | Krijn | F21K 9/00 |
| | | | 372/29.02 |
| 2011/0194121 A1* | 8/2011 | Ertl | A61B 5/0088 |
| | | | 356/610 |

* cited by examiner

APPARATUS AND METHOD FOR CURVATURE AND THIN FILM STRESS MEASUREMENT

FIELD OF THE INVENTION

The present invention generally relates to apparatus and method for curvature and thin film stress measurement, and more particularly to apparatus and method for curvature and thin film stress measurement by using two independent light sources.

DESCRIPTION OF THE RELATED ART

Current in-situ curvature tools applied in equipment for metal-organic chemical vapor deposition process (MOCVD) generally uses a single laser light source to measure curvature. The principle of measuring curvature by using a single laser light source is to utilize a laser beam to impinge on chips and to calculate warp and stress of the chip by measuring the displacement of the reflection of the laser beam resulting from the warp of the chip surface.

U.S. Pat. No. 7,570,368 discloses a method and apparatus for measuring the curvature of reflective surfaces by using a single laser light source. As shown in FIG. 1, the apparatus uses a laser emitter 32 to emit a laser beams which is directed through a beam splitter 34 and downward into a chamber 10, and then is impinged onto a wafer 24 on a carrier 12 in the chamber 10. However, since only one laser emitter 32 is used, in order to measure the warp of the surface of the chips on the wafer 24, the carrier 12 must be rotated so that the laser beam can be impinged on different locations of the surface of the chips. The warp or curvature of the surface of the chips can thus be calculated via different normal vectors of the different locations caused by the warp of the surface of the chips. The disadvantages of these method and apparatus for measuring the curvature include: no measurement can be achieved without moving the chips, and the inevitable shaking phenomena caused by the rotation of the carrier 12 that would generate errors of measurement.

U.S. Pat. No. 7,505,150 also discloses a device and method for the measurement of the curvature of a surface. Unlike the above-mentioned U.S. Pat. No. 7,570,368, as shown in FIG. 2, the device uses a single semiconductor laser light source 2 to emit a laser beam through a birefringent element 4 to generate parallel partial beams which are reflected by a mirror 18 to the surface 1 of a specimen. The warp or curvature of the surface 1 of the specimen is detected via the detector 5 through the distance variation between the reflected partial beams caused by the warp or curvature of the surface 1. Advantages of this technique include measuring warp or curvature without moving the specimen. Disadvantages of this technique include the use of complicated optical components, and limited measuring range.

FIG. 3 shows a two-dimensional chip curvature measurement device using a laser beam array. Advantages of this technique include measuring warp or curvature without moving the specimen. Disadvantages of this technique include the significant amount of computation necessary and the use of extremely complicated optical components.

Therefore, the invention herein provides apparatus and method for curvature and thin film stress measurement by using two independent light sources which can avoid the disadvantages of the conventional curvature and stress measurement techniques set forth, effectively decrease the manufacturing costs and make the system more agile.

SUMMARY OF THE INVENTION

The invention utilizes twin independent light sources so that the range of measurement can be effectively increased. Since two independent light sources are used, the curvature of the chip can be measured without moving the chip. The apparatus of the invention benefits from a relatively simple optical system with a small size and thus the production cost can be reduced and the apparatus can be more agile. Furthermore, the apparatus with two independent light sources can be calibrated by a simple method and can be self-aligned via a detector.

The invention provides an apparatus for curvature and thin film stress measurement. The apparatus comprises a first light source and a second light source, a first collimator and a second collimator, a beam splitter and a detector. The second light source and the first light source are located such that an angle is formed between a second light beam from the second light source and a first light beam from the first light source. The first light beam and the second light beam projects on a specimen after being nearly collimated by the first collimator and the second collimator. The beam splitter is configured to be located between the first collimator and the second collimator and the specimen. The beam splitter reflects the first light beam and the second light beam reflected from the specimen to the detector.

The invention further provides an apparatus for curvature and thin film stress measurement. The apparatus comprises two light sources and a detector. The light sources are located such that an angle is formed between two light beams from the light sources respectively. The light beams are nearly collimated to project onto a specimen, wherein a short distance is exists between locations of the light beams on the specimen. The detector receives the light beams reflected from the specimen and calculates a curvature of the specimen according to a separation between spots of the light beams on the detector or a variation of a spot size of one of the light beams.

The invention further provides a method for curvature and thin film stress measurement, the method comprises the following steps. First of all, two non-parallel light beams with an angle therebetween are provided. Then the light beams are nearly collimated and projected onto a specimen, wherein a distance exists is between locations of the light beams on the specimen. Next the light beams reflected from the surface of the specimen are transmitted to a detector. Finally, a curvature of the specimen is calculated according to a separation between spots of the light beams on the detector or a variation of the spot size of one of the light beams.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE INVENTION

Figure 1:
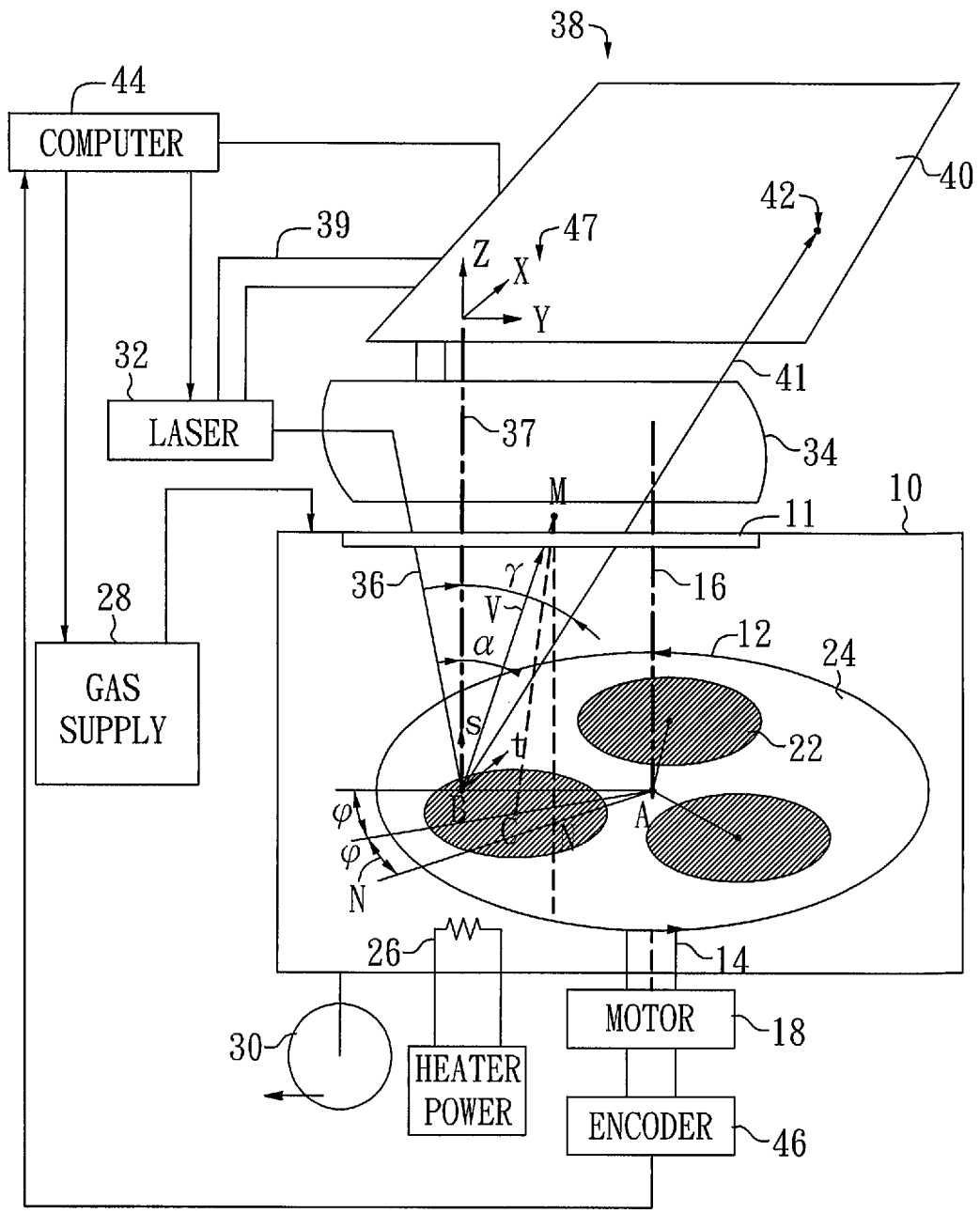
FIG. 1 illustrates a conventional apparatus for measuring the curvature of reflective surfaces by using a single laser light source.
Figure 2:
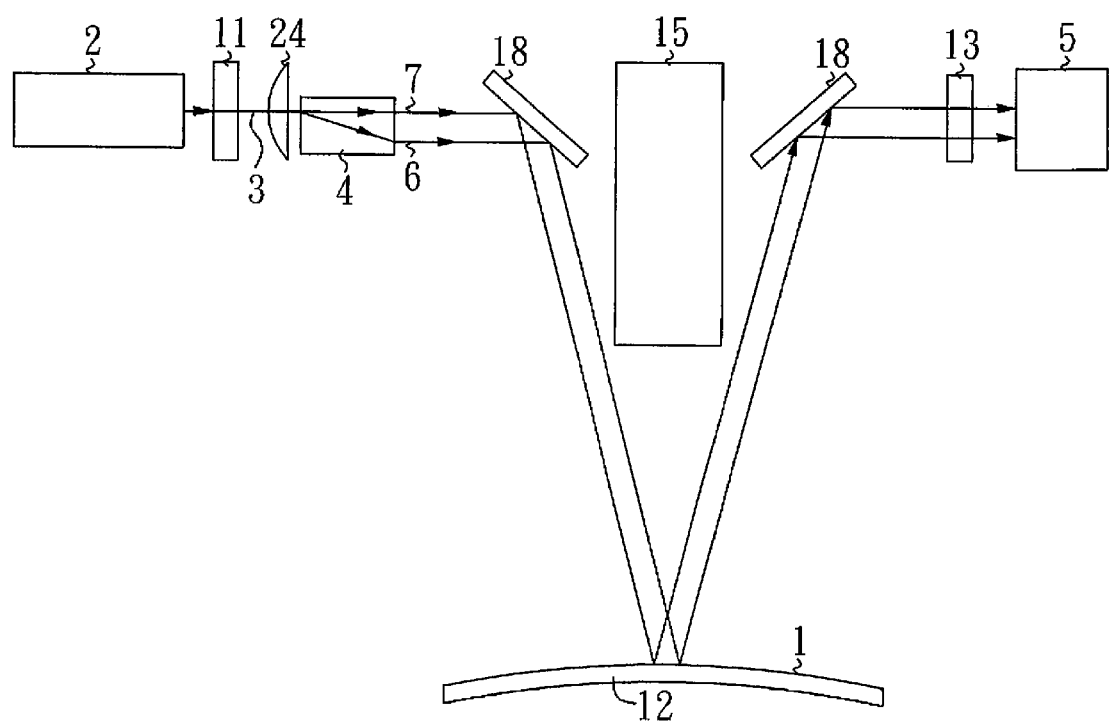
FIG. 2 shows another conventional apparatus for measuring the curvature of reflective surfaces by using a single laser light source.
Figure 3:
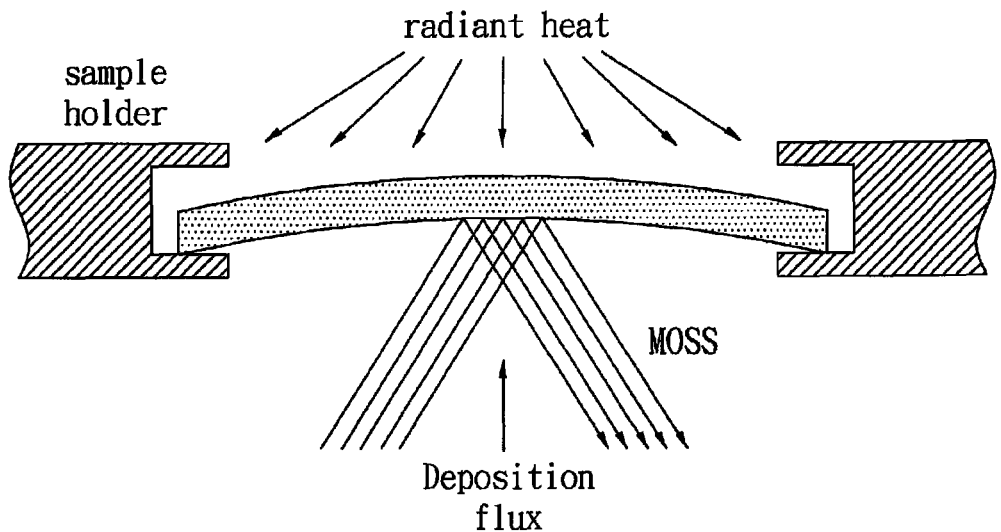
FIG. 3 shows a two-dimensional chip curvature measurement device using array-laser beam.
Figure 4A:
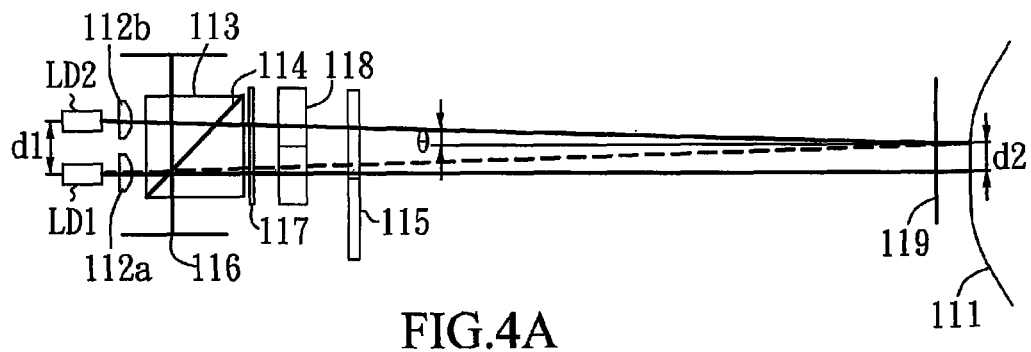
FIG. 4A shows an apparatus for curvature and thin film stress measurement with two independent light sources according to one embodiment of the invention.

FIG. 4A shows an apparatus for curvature and thin film stress measurement with two independent light sources according to one embodiment of the invention. The apparatus for curvature and thin film stress measurement with two independent light sources 110 comprises two independent light sources, an optical isolator comprising a quarter wave polarizer 117 and a prism 113 with a beam splitter 114, a narrow bandpass optical filter 118, two collimators such as condenser lenses 112a and 112b and a detector 116. The distance between the two independent light sources is d1, and the independent light sources comprise, but are not limited to, laser devices LD1 and LD2. The laser devices comprise, but are not limited to, solid state red laser devices with a wavelength 650 nm. The light beams from the independent light sources are nearly collimated by the condenser lenses 112a and 112b and project onto the surface of a specimen. The condenser lenses 112a and 112b comprise, but are not limited to, two aspheric lenses. The prism 113 comprises two half prisms and the beam splitter 114 is inside the prism 113 and at a 45 degree angle. The half prisms combine together and are glued together on their 45 degree face (the hypotenuse). The beam splitter 114 comprises a coating applied to one of these faces before the half prisms are bonded together. The coating is designed to favor one linear polarization over the other. The quarter wave polarizer 117 functions so as to minimize the portion of laser beam that goes back to the laser devices after reflection off a specimen. The quarter wave polarizer 117 reduces possible interference with the operation of the laser devices. The optical isolator sends the light beam reflected off the specimen toward the detector 116 in an efficient manner, and rejects any of this reflected light beam from coming back to the laser devices. The detector 116 comprises, but is not limited to, complementary metal oxide semiconductor (CMOS) devices or charged coupled devices (CCD). The independent light sources, the beam splitter 114, the condenser lens 112a and 112b and the detector 116 are configured to be located outside a reaction chamber. If the independent light sources are the laser devices LD1 and LD2, for example, the laser beams therefrom will be nearly collimated through the condenser lenses 112a and 112b and project through a window 115 and an aperture 119 of a reaction chamber onto the surface of the specimen in the reaction chamber. The laser beams finally come to a fine focus at the detector 116. The specimen comprises a chip 111. The reaction chamber comprises, but is not limited to, reaction chambers of physical or chemical vapor deposition equipment, such as a metal-organic chemical vapor deposition equipment. The specimen comprises wafers for calibration of the apparatus for curvature and thin film stress measurement and wafers under manufacture process.

In another embodiment of the present invention, the apparatus for curvature and thin film stress measurement further comprises a prism to deflect light beams from the independent light sources by an angle of 90 degrees. The prism can be applied to divert light beams from multiple laser light sources to save space. The prism can be configured to be located between the independent light sources and the surface of the specimen to turn the directions of the light beams toward the specimen. For example, a prism can be located on the path of the light beams and between the condenser lenses 112a and 112b and the beam splitter 114 shown in FIG. 4A. The laser beams from the laser devices LD1 and LD2 are nearly collimated by the condenser lenses 112a and 112b, and then are refracted or deflected by the prism toward the surface of the specimen or the chip 111.

In one embodiment, the laser device LD1 of the apparatus for curvature and thin film stress measurement 110 is adjusted to aim and to be vertical to the center region of an inspection area of the chip 111. The distance between the laser devices LD1 and LD2 is designated as d1, and the laser beam from the laser device LD1 impinges vertically to the center region of an inspection area of the chip 111. The laser beam from the laser device LD2 is tilted or inclined at an angle θ and impinges onto a location having a distance d2 away from the center region of the inspection area of the chip 111. The angle θ is the angle between the laser beams from the laser devices LD1 and LD2 respectively. The apparatus for curvature and thin film stress measurement 110 must be calibrated before being used to measure curvature of the chip 111. During calibration, the angle θ and distance d2 are set to render the laser beams from the laser devices LD1 and LD2 reflecting from the surface of the chip 111 to the beam splitter 114 and then reflecting again by the beam splitter 114 impinging on the same location of the detector 116 if the surface of the chip 111 is flat. That is, the spots of the laser beams from the laser devices LD1 and LD2 must overlap on the detector 116. When the surface of the chip 111 is not flat and has a curvature (the surface of the chip 111 in FIG. 4A is convex), the spot of the laser beam from the laser device LD2 reflecting from the surface of the chip 111 to the beam splitter 114 and then reflecting again by the beam splitter 114 impinging on the surface of the detector 116 will depart from the spot for laser device LD1 and be displaced. The warp and curvature of the surface of the chip 111 can be measured by measuring the distance between the spots of the laser beams of the laser devices LD1 and LD2 impinging on the detector 116.

Figure 4B:
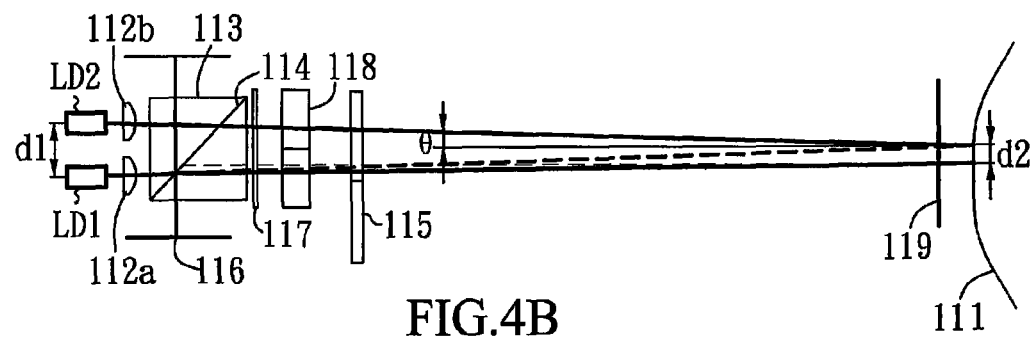
FIG. 4B shows an apparatus for curvature and thin film stress measurement with two independent light sources according to another embodiment of the invention.

FIG. 4B shows an apparatus for curvature and thin film stress measurement with two independent light sources according to another embodiment of the invention. In this embodiment, the laser device LD1 of the apparatus for curvature and thin film stress measurement 110 is adjusted to aim and to be non-vertical to a region of an inspection area of the chip 111. The distance between the laser devices LD1 and LD2 is also designated as d1, the laser beam from the laser device LD1 is not vertical to the surface of the chip 111 and the angle there between is deviated from 90 degree, such as deviated 0.5 degree from 90 degree. The laser beam from the laser device LD1 thus deviates slightly away from the center region of the inspection area and thus the laser beams reflected from the surface the chip 111 is slightly higher than the incident laser beam so as to prevent the reflected laser beam directly reflecting back to the laser device LD1. The laser beam from the laser device LD2 still tilts or inclines an angle θ and impinges onto a location having a distance d2 away from the location of the laser beam from the laser device LD1 on the surface of the chip 111. The angle θ is the angle between the laser beams from the laser devices LD1 and LD2 respectively. The apparatus for curvature and thin film stress measurement 110 must be calibrated before being used to measure curvature of the chip 111. During calibration, the angle θ and distance d2 are set to render the laser beams from the laser devices LD1 and LD2 reflecting from the surface of the chip 111 to the beam splitter 114 and then reflecting again by the beam splitter 114 overlapping on the detector 116 if the surface of the chip 111 is flat. The warp and curvature of the surface of the chip 111 can be measured by measuring the distance between the spots of the laser beams of the laser devices LD1 and LD2 impinging on the detector 116.

Figure 5:
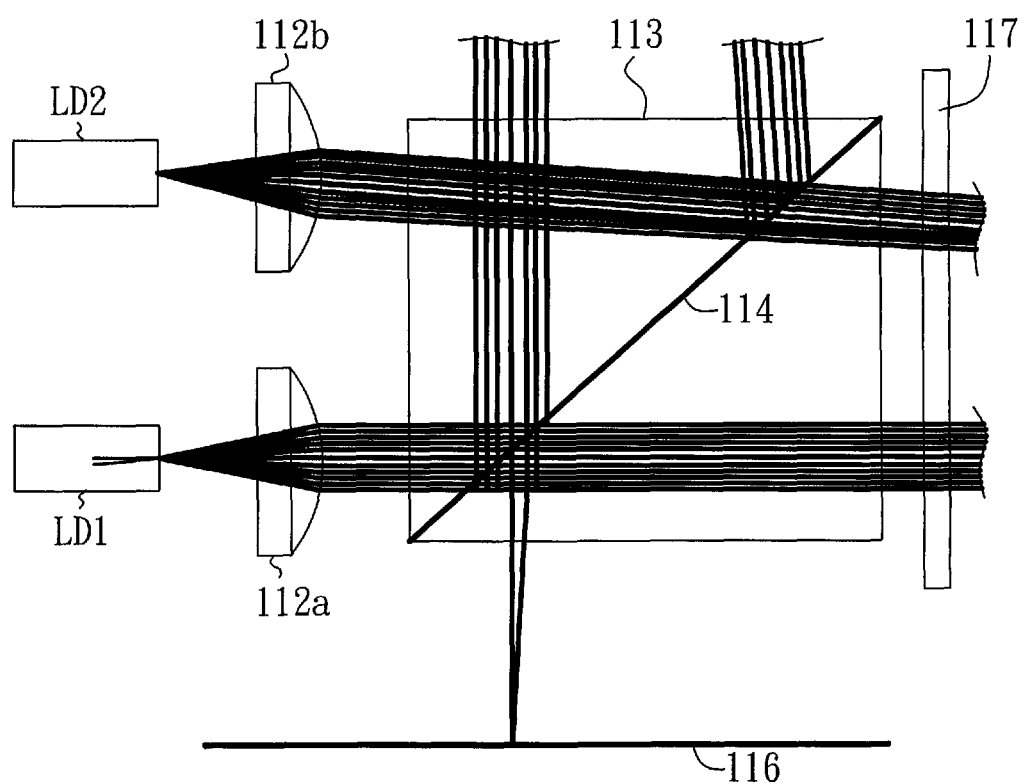
FIG. 5 shows a partial enlarged structure of the apparatus for curvature and thin film stress measurement shown in FIG. 4A.

FIG. 5 shows a partial enlarged structure of the apparatus for curvature and thin film stress measurement shown in FIG. 4A. The laser beams from the laser devices LD1 and LD2 are nearly collimated by the condenser lenses 112a and 112b and are reflected after a trip to the chip 111 back to the beam splitter 114 and then the detector 116. The laser device LD1 can be adjusted to aim for the center or the location near the center of the sampling area so that the laser beam is vertical or slightly deviated from vertical and inclined with an angle to the sampling area of the chip 111. During alignment and calibration, the laser beams from the laser devices LD1 and LD2 are adjusted so as to impinge on the same location of the detector 116 after being reflected from the surface of the chip 111 and the beam splitter 114 if the surface of the chip 111 is flat. The spots of the laser beams from the laser devices LD1 and LD2 on the detector 116 are adjusted to be overlapped to complete the alignment and calibration of the apparatus for curvature and thin film stress measurement. The curvature of the surface of a wafer must be measured during the manufacturing process since the surface of chips on the wafer would warp due to stress resulting from heating or epitaxial process. If the surface of the chip is convex, the spot of the laser beam from the laser device LD2 reflecting by the beam splitter 114 impinging on the surface of the detector 116 will be displaced since the curvature of the chip surface will alter the path of the laser beam reflected from the surface. The spot of the laser beam from the laser device LD1 remains on the same location. The warp and curvature of the surface of the chip can be measured by measuring the displacement of the spot of the laser beam from the laser device LD2 impinging on the detector 116. If the surface of the chip is concave, the spot of the laser beam from the laser device LD1 remains almost on the same location on the detector 116, while the spot of the laser beam from the laser device LD2 impinging on the surface of the detector 116 will be displaced in an opposite direction since the curvature of the chip surface will also alter the path of the laser beam reflected from the surface. The spot of the laser beam from the laser device LD1 remains on the same location. The warp and curvature of the surface of the chip can be measured by measuring the displacement of the spot of the laser beam from the laser device LD2 impinging on the detector 116. If the detector 116 is a charged coupled device or other area detector, the locations of the spots of the laser beams from the laser devices LD1 and LD2 on the detector 116 can be distinguished by the signals measured from such charged coupled device, CMOS, or other area detector, which can provide high-speed image information.

When the surface of the chip being measured is convex, the curvature of the surface of the chip can also be measured by measuring the variation of the spot of the laser beam from the laser device LD1 in addition to using the displacement or distance between the two spots from the laser devices LD1 and D2 on the detector 116. Particularly, when the curvature of the surface of the chip is too high, the spot from the laser device LD2 could be located outside the detecting range of the detector 116 due to a large displacement of the spot. The spot from the laser device LD1 on the detector 116 could also be out of focus due to the deformation of the reflecting zone sampled on the surface of the chip (the center of the chip or a location near the center of the chip). Thus the size variation of the spot of the laser beam from the laser device LD1 can also be used to measure the curvature of the surface of the chip 111.

When a wafer is under a manufacturing process in a reaction chamber, the warp or curvature phenomena on the surface of a chip due to the stress resulting from the process such as heating or epitaxial process can be monitored in real time by measuring the displacement of the spots of the independent light sources on the detector. Through alignment to render the spots of the non-parallel laser beams from the laser devices LD1 and LD2 and reflecting from a flat surface and overlapping on the detector, and by bringing each spot from LD1 and LD2 to a fine focus on the detector, the range of measurement is larger than the apparatus using parallel laser beams. The range of measurement can be determined according to the spot size of the laser beams and the size of the detector.

The invention utilizes twin independent light sources to measure the curvature of a chip via the distance between the spots of the light sources and the sizes of the spots so that the range of measurement can be effectively increased. Since two independent light sources are used, the curvature of the chip can be measured without moving the chip. Since the chip does not need to be moved, the shaking phenomena caused by the rotation of the carrier in an apparatus using a single light source can be avoided. The apparatus of the invention has an advantage of relatively simple optical system with a small size and thus the production cost can be reduced and the apparatus can be more agile. Furthermore, the apparatus with two independent light sources has a simple calibration method and can be self-aligned via a detector.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for curvature and thin film stress measurement, comprising:
    a first light source and a second light source being configured to be located side by side and apart with a first distance, a first light beam from the first light source is tilted or inclined relative to a second light beam from the second light source;
    a first collimator and a second collimator, the first light beam from the first light source and the second light beam from the second light source projecting on a specimen apart with a second distance after being approximately collimated by the first collimator and the second collimator, such that the first light beam and the second light beam are brought to a sharp focus on the detector, after reflection from the specimen, wherein the first light beam from the first light source is tilted or inclined relative to the second light beam such that the first distance is larger than the second distance:
a beam splitter being configured to be located between the first collimator and the second collimator and the specimen; and
a detector, the beam splitter reflecting the first light beam and the second light beam reflected from the specimen to the detector specimen and calculating a curvature of the specimen according to a separation between spots of the first and second light beams on the detector, wherein the spots of the first and second light beams on the detector overlap if the specimen is flat.

2. The apparatus as claimed in claim 1, wherein the first light source and the second light source directly project the first light and the second light onto the specimen.

3. The apparatus as claimed in claim 1, wherein the first light beam and the second light beam are deflected to project onto the specimen.

4. The apparatus as claimed in claim 1, wherein the beam splitter comprises a coating designed to favor one linear polarization over the other.

5. The apparatus as claimed in claim 1, wherein the first light source and the second light source comprise two separate laser devices.

6. The apparatus as claimed in claim 1, wherein the first and second collimators comprise precision aspheric lenses.

7. The apparatus as claimed in claim 1, wherein the first light source directly projects the first light beam vertically or non-vertically onto a center region or a region adjacent the center region of the specimen or projects the first light beam onto the specimen after being deflected onto the center region or the region adjacent the center region of the specimen vertically or non-vertically.

8. The apparatus as claimed in claim 1, wherein the specimen is located in a reaction chamber.

9. The apparatus as claimed in claim 1 further comprising a quarter wave polarizer located between the beam splitter and the specimen.

10. An apparatus for curvature and thin film stress measurement, comprising:
two light sources a first light source and a second light source being located side by side and apart with a first distance, a first light beam from the first light source is tilted or inclined relative to a second light beam from the second light source such that an angle is formed between two light beams from the light sources respectively, the first and second light beams being focused sharply at the detector, after first reflecting from a specimen, wherein a second distance is between locations of the first and second light beams on the specimen and the first light beam from the first light source is tilted or inclined relative to the second light beam such that the first distance is larger than the second distance: and
a detector, the detector receiving the first and second light beams reflected from the specimen and calculating a curvature of the specimen according to a separation between spots of the first and second light beams on the detector, wherein the spots of the first and second light beams on the detector overlap if the specimen is flat.

11. The apparatus as claimed in claim 10, wherein the light sources comprise solid state red laser devices with a wavelength 650 nm.

12. The apparatus as claimed in claim 10, wherein the spots of the first and second light beams on the detector overlap if the surface of the specimen is flat.

13. The apparatus as claimed in claim 10, wherein the displacement between spots of the first and second light beams on the detector occurs if the surface of the specimen is convex or concave.

14. The apparatus as claimed in claim 10 further comprising a quarter wave polarizer located between the first and second light sources and the specimen.

15. A method for curvature and thin film stress measurement, comprising:
providing a first light beam from a first light source and a second light beam from a second light source, wherein the first light source and the second light source is configured to be located side by side and apart with a first distance, and the first light beam is tilted or inclined relative to the second light beam;
projecting the first and second light beams onto a specimen, wherein a second distance is between locations of the first and second light beams on the specimen and the first light beam from the first light source is tilted or inclined relative to the second light beam such that the first distance is larger than the second distance;
receiving the first and second light beams reflected from the surface of the specimen; and
calculating a curvature of the specimen according to a displacement between focused spots of the first and second light beams on a detector, wherein the spots of the first and second light beams on the detector overlap if the specimen is flat.

* * * * *